Oct. 4, 1949.  E. R. MANN ET AL  2,483,471
PROCESS AND APPARATUS FOR EXAMINING MATERIALS
Filed Jan. 24, 1945  2 Sheets-Sheet 1
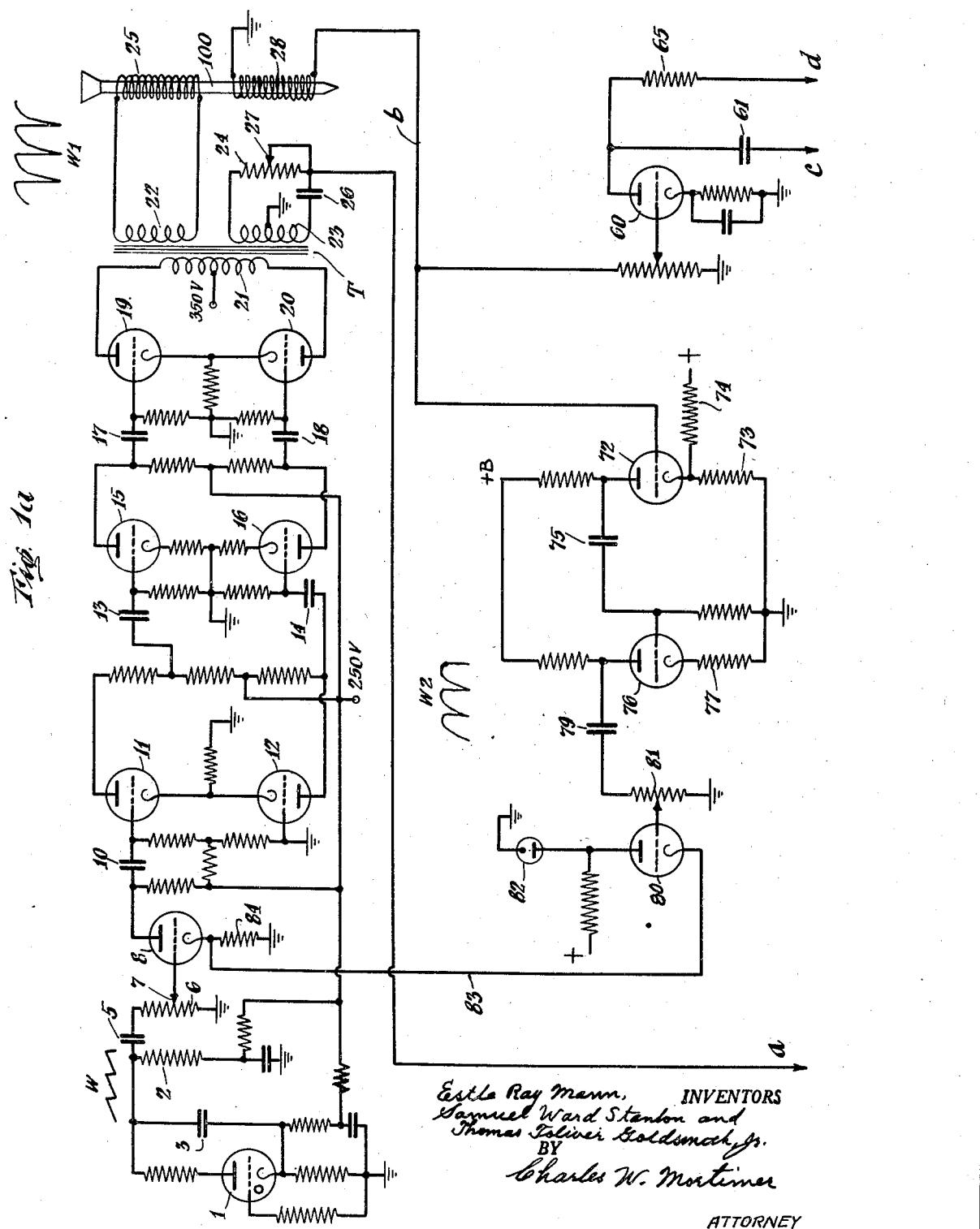

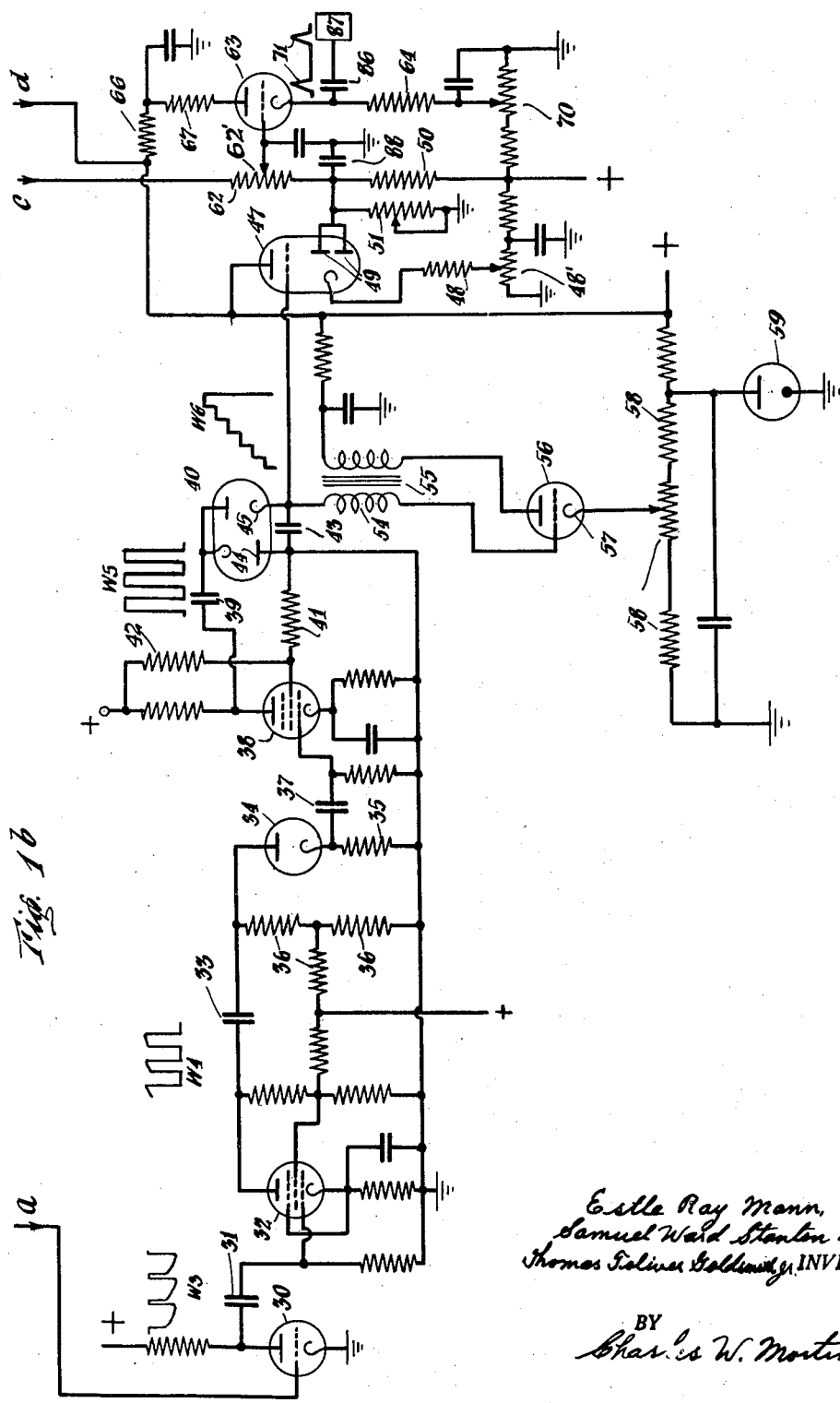

Patented Oct. 4, 1949

2,483,471

UNITED STATES PATENT OFFICE 2,483,471

PROCESS AND APPARATUS FOR EXAMINING MATERIALS

Estle Ray Mann, Upper Montclair, Samuel Ward Stanton, Glen Ridge, and Thomas Toliver Goldsmith, Jr., Cedar Grove Township, Essex County, N. J., assignors to Allen B. Du Mont Laboratories, Inc., Passaic, N. J., a corporation of Delaware Application January 24, 1945, Serial No. 574,414

2 Claims. (Cl. 175—183)

This invention relates to a device and process for examining materials. It is particularly useful for examining magnetic materials for the purpose of ascertaining properties thereof without changing the properties or injuring the material in any way. The invention will be particularly described in connection with testing metals, but it is not limited to the testing of metals.

Prior devices have been made for making comparisons between metals, one of which may be taken as a standard. Such devices are capable of being used to give qualitative indications by comparing an unknown piece with a piece having known characteristics. The present device can be used as a measuring instrument and can be calibrated so as to give quantitative indications. Therefore, graduated dials can be used with it for taking readings.

It has been known for a long time that there are relations between the magnetic properties of different metals and their hardness, tensile strength and flexibility, for example. Devices have been made heretofore for determining carbon content of steels which are in the same stage of heat treatment by comparing the permeability of a sample with that of a known sample.

Other devices have been made heretofore for determining the carbon content by measuring the remanent magnetism of the specimen after it had been magnetized by a fixed magnetizing field. In this latter case the steel specimen was magnetized by a fixed constant magnetizing field produced in one type of instrument by a fixed current in a coil of wire surrounding the specimen. In another type of instrument a permanent magnet was brought near the steel specimen to supply a fixed magnetizing field.

In each of one of these two instruments for measuring the remanent magnetism in the steel specimen a pick-up coil surrounded the specimen. This coil was connected to a ballistic galvanometer with a switch in the circuit. The galvanometer was not inverted into this circuit until the sample had been magnetized and while the magnetizing field was yet present. Then with the galvanometer in the circuit the magnetizing field was removed.

The collapse of the magnetization of the steel core in the pick-up coil induced an electromotive force in this coil. The ballistic galvanometer integrated the current produced by this voltage pulse. The maximum throw of the ballistic galvanometer was proportional to the total charge sent through it by the voltage pulse and accordingly was proportional to the total change in flux occurring in the steel core.

If the flux were brought to a fixed level for each specimen and then allowed to collapse the throw of the ballistic galvanometer would be dependent on the remanent magnetism of the specimen. The greater the remanent magnetism the smaller the throw. No provision was heretofore made to bring the flux to a predetermined fixed level.

Since the carbon content of steel influences the remanent magnetism the throw of the ballistic galvanometer can be interpreted in terms of the carbon content of the steel.

In contrast to prior practice, the present invention is for testing materials, particularly steels, by subjecting them to pulsating magnetic fields in such a manner that the flux density of magnetization is controlled and brought to a predetermined fixed level for each test.

In carrying out the present invention the material is magnetized comparatively slowly and then suddenly demagnetized at least partially. This may be repeated as many times as desired.

The remanent magnetism in any particular piece of steel after it has been magnetized depends largely upon the amount of magnetization that has been produced in the piece. Therefore, to obtain comparable amounts of magnetization correspondingly smaller magnetizing fields should be used for higher permeability metals than for lower ones. This is taken care of in accordance with the present invention by automatic flux density control similar in principle to automatic volume control in radio receivers.

The invention may be understood from the description in connection with the accompanying drawing which is shown on two sheets.

In the drawing, reference character 1 indicates a gas filled triode or Thyratron which with the accompanying connections constitutes a sawtooth wave generator which is indicated at W. The time constant of this sawtooth wave generator is determined by the resistance 2 and condenser 3. The frequency may be as high as about 18 cycles per second. About 10 cycles per second has been found to be very satisfactory. Appropriate filters are provided for the plate current. The sawtooth wave is coupled by the condenser 5 to the resistance 6. A sliding contact 7 on this resistance connects it to the grid of triode 8. The output of this triode is coupled by condenser 10 to the balanced phase inverter comprising tubes 11 and 12 and connections to provide a phase inverter of the known sort.

Coupling condensers 13 and 14 are provided to connect the output of the phase inverter to the push-pull amplifier comprising tubes 15 and 16, and similar coupling condensers 17 and 18 connect the output of the amplifiers 15, 16 to the grids of the push-pull amplifier comprising tubes 19 and 20.

The primary 21 of transformer T has its opposite ends connected respectively to the plates of the tubes 19 and 20. The transformer T is provided with secondaries 22 and 23, the secondary 23 being grounded at its center. One end of this secondary 23 is connected to the resistance 24 and the other end is connected through the condenser 26 to a sliding contact on the resistance 24.

The ends of the coil 25 are connected to the ends of the coil 22 and a coil 28 is aligned with the coil 25 for a purpose to be described.

A lead $a$ extends from a point between the condenser 26 and the lower end of the resistance 24. A sliding contact 27 is provided to vary the resistance 24. The lead $a$ extends to the grid of the amplifier 30 (Sheet 2). The output of this amplifier is coupled by condenser 31 to the control grid of the pentode 32, which has its cathode biased by resistance. The tube 32 has plate and screen potentials so adjusted that it operates as a clipping tube. A coupling condenser 33 couples the output of pentode 32 to the plate of the diode 34 which has a resistance 35 in its cathode circuit. Resistors 36 are used to apply positive potential to the plate of the diode 34.

The condenser 37 couples the cathode of tube 34 to the control grid of pentode 38. This pentode 38 also operates as a clipping tube. A condenser 39 couples the output of the tube 38 to a plate and cathode of the double diode 40. The other plate 44 of the double diode 40 is connected to ground, and the other cathode 45 is connected to a blocking tube oscillator to be described. A condenser 43 is connected between the plate 44 and cathode 45 of the double diode. The cathode 45 is connected to the grid of the tube 47 which is provided with a cathode resistance 48 connected to a sliding contact on resistance 48'. The plates 49 for the diode section of the tube 47 are connected to a source of positive potential.

The primary 54 of the transformer 55 of the blocking tube oscillator is connected to the grid of the tube 56. The cathode 57 of this tube is connected by sliding contact to the resistance 58 between a source of positive potential and ground. A voltage regulator 59 is connected to the resistance 58.

The lead $b$ extends from the lower end of the coil 28 (Sheet 1a) to the grid of the triode 60 of which the cathode is biased by a resistance with a condenser in parallel therewith. The plate of the tube 60 is coupled by condenser 61 and lead $c$ and a calibrated variable contact 62' (Sheet 1b) on resistance 62 to the grid of the triode 63. A resistance 64 in series with the variable resistance 70 is provided in the cathode circuit of this tube. This resistance 70 is located between a source of positive potential and ground. The plate of the tube 60 is also connected through resistance 65 and lead $d$ to a source of positive potential.

The lead $b$ is also connected from the lower end of coil 28 to the grid of the triode 72 of which the cathode is biased by resistance 73 through which current is fed from a source of positive potential through resistance 74. The plate of the tube 72 is coupled by condenser 75 to the grid of tube 76 of which the cathode is biased by resistance 77.

The plate of the tube 76 is coupled by condenser 79 to the grid of the tube 80 through a sliding contact on resistance 81, one end of which is connected to ground. A voltage regulator 82 is provided for the potential that is fed to the plate of the tube 80. A lead 83 extends from the cathode of the tube 80 to the cathode of the tube 8 which is biased by resistance 84.

A condenser 86 (Sheet 1b) couples the cathode of the tube 63 to an indicating device 87 which shows the amplitude of the pulses from the condenser 86. This indicating device may, for example, be the ballistoscope described in application Serial No. 535,494, filed May 13, 1944 by two of the applicants herein, namely, Mann and Stanton. The indicating device is not a part of this invention, but mention of one facilitates selection of a suitable one.

This device operates as an electronic ballistic galvanometer and gives an indication visually in the form of a spiral trace on the screen of a cathode ray tube, the diameter of the initial convolution of the spiral being proportional to the total charge flowing during the interval of the pulse duration.

The operation is as follows:

A sample of the steel to be examined is obtained by pouring some of the molten steel of a batch into a mold that will form a sample to fit into the coils 25 and 28, as shown by the reference character 100. A chemical analysis may be made of another sample of the same batch.

The sample is magnetized and permitted to become demagnetized in accordance with the frequency of the sawtooth wave W generated by the generator 1. This wave is amplified by tube 8 and coupled to the balanced phase inverter 11, 12. The signals in phase opposition are amplified by the push-pull amplifiers 15, 16 and 19, 20. The amplified output sawtooth signal, which may have a frequency of say ten cycles per second, depending upon the frequency of the signal W, is impressed on the grids of vacuum tubes 19 and 20. The current in the primary 21 of the transformer T is essentially of the sawtooth wave form W. The current in the secondary 22 of the transformer T is of the wave form shown as W1. The magnetic flux set up in the sample 100 is essentially of the same wave form W1. The coupling between coils 25 and 28 is produced almost entirely by the sample 100. Accordingly the magnetic properties of this sample influence the potential developed across the coil 28.

The wave W2 taken off of the phase shifter 23, 24, 26 and 27 by lead $a$ is applied to the control grid of tube 30 (Sheet 1b). The wave W3, which is the output of tube 30, is clipped by the clipper which includes the tube 32 to yield wave W4. This wave is applied to diode 34 from the cathode of which a corresponding wave is coupled by condenser 37 to the control grid of pentode 38 which further clips and shapes the signal to produce the output wave W5 of substantially rectangular impulses.

The wave W5 applied to the double diode 40 charges the condenser 43 as indicated by the wave W6 until the potential on the grid of the tube 56 of the blocking tube oscillator 54—57 causes this tube to fire. The potential at which this tube 56 fires is controlled by the movable contact on resistance 58. When the tube 56 fires, the condenser 43 immediately discharges, whereupon the wave W6 begins another cycle.

The voltage W6 built up across condenser 43 is impressed upon the grid of tube 47 which is a high mu tube with a duo-diode in the same envelope. Its cathode is biased by a movable contact on resistance 48' and the output is taken from the cathode of this tube 47 by way of the diode plates thereof when the potential of its control grid is cut down by the blocking tube oscillator 56. By adjusting the voltage on the cathode of tube 47 with the sliding contact on resistance 48' and adjusting the voltage on the diode plates 49 by means of the contact on resistance 51, any desired step of the voltage W6 can be used to cause tube 47 to conduct from plate 47 at top to cathode at bottom left.

When tube 47 conducts, the current through its cathode resistor 48 raises the cathode potential, thus lowering the current flowing from the source of positive potential through resistance 50 and the diode plates 49 to the cathode. This reduces the voltage drop across resistance 50 causing the potential at its upper end to increase. This increased potential is applied to the grid of tube 63 through the sliding contact 62' on resistance 62. The cathode of tube 63 is biased by adjusting the sliding contact of resistance 70 until this tube is just below cut-off at the final step of the wave W6.

The pulse of voltage from the coil 28 is simultaneously applied to the grid of tube 60. The output of this tube is coupled through condenser 61 and lead c to the upper end of resistance 62, then through condenser 88 to ground. There then exists across resistance 62 a pulse voltage, a portion of which may be picked off by the sliding contact 62' and impressed on the grid of tube 63. Since this tube 63 is already biased to just below cut-off at the final step of wave W6, a small pulse will cause it to conduct, whereupon the voltage across its cathode resistor 64 increases and positive pulses 71 are coupled through condenser 86 to the indicating device 87.

The pulses 71 are spaced in accordance with the frequency of firing of the blocking tube oscillator 56. The contact 27 on resistance 24 of the phase shifter 23, 24, 26, can be adjusted so that the pulses 71 occur at the middle of a horizontal portion of a step of wave W6.

For automatic flux density control the signal from coil 28 is applied to the grid of class B amplifier tube 72 that is provided with a biased cathode. The output of this tube is coupled by condenser 75 to the grid of tube 76. The output of the plate of this tube 76 is coupled by condenser 79 and sliding contact on resistance 81 to the cathode follower tube 80. The cathode of tube 80 is connected to the cathode of tube 8 so that the feedback from coil 28 keeps the signal from coil 28 substantially constant because it is fed back degeneratively after being amplified. In this way the flux through the specimen 100 is kept substantially uniform regardless of the permeability of the steel.

This automatic flux density control is highly useful in this device because magnetic retentivity of the steel being tested for carbon content is utilized for testing the steel. The amount of remanent magnetism in a piece of steel depends largely upon the extent to which it has been magnetized. With a magnetizing field of fixed strength a piece of the steel of higher permeability is magnetized more than one of lower permeability. Therefore, pieces of steel that are tested by magnetic fields to examine the same for hardness or carbon content should be subjected to magnetic fields of strengths differing accordingly. By providing the automatic flux density control described herein, this is automatically accomplished to a very large extent or entirely. Besides, the influence of manganese and other materials in steel upon its permeability is largely, if not entirely, removed by the automatic flux density control so that the carbon content or hardness of the steel samples can be determined with great accuracy by testing them with this device.

In using this invention for determining carbon content of steel, a standard sample of the steel is inserted in the test coils 25, 28 and sliding contact 62' on resistor 62 is adjusted until a predetermined pattern is obtained on the indicating device 87. The readings on the dial controlling contact 62' may be calibrated in terms of carbon content. The operation can be completed in less than one minute. Very little skill is required on the part of the operator.

Prior devices for testing carbon content of steel show marked non-linearity in the relation between carbon content and instrument indications due to the fact that both permeability and remanent magnetism influence these indications. Factors other than carbon content also influence the permeability. Prior devices for determining carbon content of steel whose indications are appreciably influenced by permeability require considerable skill on the part of the operator since the functional dependence of permeability on the carbon content is not linear.

The present device for all practical purposes eliminates the influence of permeability on its indications and utilizes remanent magnetism which is influenced by the carbon content of the steel. The remanent magnetism of steel depends essentially upon the carbon content thereof. Consequently, this practical relationship between the two makes it possible to provide a device as described herein which can be used efficiently and reliably by an unskilled operator to ascertain the carbon content of steel.

What is claimed is:

1. A device for testing magnetic material which comprises a sawtooth wave generator, amplifying means for said sawtooth wave, a coil surrounding said magnetic material and operatively connected to the output of said amplifying means, whereby a magnetic field the intensity of which varies in sawtooth manner, may be set up in said magnetic material, a second coil surrounding said magnetic material which has induced therein a voltage due to the changes in said magnetic field in said material, said voltage being amplified by a gated amplifier and applied to an indicating device, said gated amplifier being gated by a signal derived from said sawtooth wave generator so phased as to gate said gated amplifier at the time that said magnetic field is collapsing, and so timed by means of a counter circuit incorporated in the circuits producing said gating signal as to permit said magnetic field to be set up in said magnetic material a predetermined number of times before producing said gating signal.

2. The device of claim 1, in which a portion of the voltage induced in said second coil is fed back to control said amplifying means to keep said variations of said magnetic field uniform.

ESTLE RAY MANN.
SAMUEL WARD STANTON.
THOMAS TOLIVER GOLDSMITH, Jr.

(References on following page)

REFERENCES CITED

The following references are of record in the file of this patent:

UNITED STATES PATENTS

| Number | Name | Date |
|---|---|---|
| 890,085 | McCann et al. | June 9, 1908 |
| 1,596,615 | Malmberg et al. | Aug. 17, 1926 |
| 1,943,619 | Mudge et al. | Jan. 16, 1934 |
| 2,054,672 | Edgar | Sept. 15, 1936 |
| 2,110,759 | De Forest | Mar. 8, 1938 |
| 2,152,690 | Hana | Apr. 4, 1939 |
| 2,234,456 | Schaurte et al. | Mar. 11, 1941 |
| 2,333,976 | Blosjo | Nov. 9, 1943 |
| 2,337,231 | Cloud | Dec. 21, 1943 |
| 2,406,870 | Vacquier | Sept. 3, 1946 |

OTHER REFERENCES

Rogers et al.; Transactions American Society for Metals, Dec. 1941, pages 969–982.